(12) United States Patent
Harrison et al.

(10) Patent No.: US 7,746,045 B2
(45) Date of Patent: *Jun. 29, 2010

(54) DISTRIBUTING TIME SLOTS IN PARALLEL CONFIGURED, SWITCHING POWER SUPPLIES

(75) Inventors: William Todd Harrison, Apex, NC (US); Xuening Li, Cary, NC (US)

(73) Assignee: Texas Instruments Incorporated, Dallas, TX (US)

( * ) Notice: Subject to any disclaimer, the term of this patent is extended or adjusted under 35 U.S.C. 154(b) by 382 days.

This patent is subject to a terminal disclaimer.

(21) Appl. No.: 11/684,017

(22) Filed: Mar. 9, 2007

(65) Prior Publication Data
US 2008/0158922 A1 Jul. 3, 2008

Related U.S. Application Data

(60) Provisional application No. 60/882,614, filed on Dec. 29, 2006.

(51) Int. Cl.
G05F 1/40 (2006.01)
(52) U.S. Cl. .................................... 323/268
(58) Field of Classification Search .................. 363/72, 363/71; 323/268
See application file for complete search history.

(56) References Cited

U.S. PATENT DOCUMENTS

| | | | |
|---|---|---|---|
| 4,882,664 A * | 11/1989 | Pennington | 363/41 |
| 5,142,217 A * | 8/1992 | Gontowski, Jr. | 323/272 |
| 6,819,577 B1 | 11/2004 | Wiktor et al. | |
| 6,894,464 B2 * | 5/2005 | Zhang | 323/268 |
| 6,897,636 B2 * | 5/2005 | Harris | 323/272 |
| 6,903,537 B2 * | 6/2005 | Tzeng et al. | 323/268 |
| 6,943,535 B1 * | 9/2005 | Schiff | 323/246 |
| 7,023,188 B1 * | 4/2006 | Rice | 323/271 |
| 7,157,889 B2 * | 1/2007 | Kernahan et al. | 323/268 |
| 7,332,898 B1 * | 2/2008 | Harrison et al. | 323/268 |

* cited by examiner

Primary Examiner—Bao Q Vu
Assistant Examiner—Jue Zhang
(74) Attorney, Agent, or Firm—John J. Patti; Wade J. Brady, III; Frederick J. Telecky, Jr.

(57) ABSTRACT

A multi-phase power system including a plurality of Pulse Width Modulation (PWM) controllers is provided, including a first PWM controller and at least one second PWM controller. The first PWM controller is configured to generate at least one first output signal based on a first clock signal, and to insert at least one synchronizing pulse into the first clock signal, the synchronizing pulse having a predetermined characteristic differing from pulses of the first clock signal, and to provide the first clock signal including the synchronizing pulse to the second PWM controller. The second PWM controller is configured to generate at least one second output signal based on the first clock signal, and to synchronize the generation of the first and second output signals using the synchronizing pulse within the first clock signal, thereby maintaining a predetermined phase relationship between the first and second output signals. The synchronizing pulse may be, for example, a skinny pulse or a pulse having a magnitude larger than the pulses of the first clock signal.

12 Claims, 4 Drawing Sheets

DISTRIBUTING TIME SLOTS IN PARALLEL CONFIGURED, SWITCHING POWER SUPPLIES

CROSS-REFERENCE TO RELATED APPLICATIONS

This application claims the benefit of priority of the U.S. Patent Application Ser. No. 60/882,614, filed Dec. 29, 2006.

TECHNICAL FIELD OF THE INVENTION

The present invention relates to switching power supplies, and more particularly relates to multiple phase switching power supplies that use pulse width modulation techniques.

BACKGROUND OF THE INVENTION

The switching power supply, sometimes referred to as the switching regulator, is a well known type of circuit that is used widely in the electronics industry. The switching power supply ("SPS") is a power supply that provides the power supply function through low loss components such as capacitors, inductors and transformers, using switches. An advantage is that switches dissipate very little power, and thus power conversion can be accomplished with very little power loss. That is, they are high efficiency power sources.

A certain class of SPS circuit uses multiple phase clocks controlling respective multiple controllers, for example by way of a "master" controller controlling multiple "slave" controllers, with numerous advantages. One such advantage is that for circuits that demand a source of power having a high current and fast response time, slave SPS controllers may be placed in parallel with a phase shift of their control signals to cancel output current ripple, while providing a suitably fast response. An example of such an SPS controller is described in U.S. Pat. No. 6,819,577, which issued on Nov. 16, 2004, to Stefan Wlodzimierz Wiktor et al., which is commonly assigned, and which is hereby incorporated herein by reference.

The SPS controller described in the '577 patent is an excellent solution to prior art demands, and provides a relatively small and inexpensive multiple phase SPS circuit, while still maintaining high efficiency. However, further improvements are desirable.

SUMMARY OF THE INVENTION

The following summary presents a simplified description of the invention, and is intended to give a basic understanding of one or more aspects of the invention. It does not provide an extensive overview of the invention, nor, on the other hand, is it intended to identify or highlight key or essential elements of the invention, nor to define the scope of the invention. Rather, it is presented as a prelude to the Detailed Description, which is set forth below, wherein a more extensive overview of the invention is presented. The scope of the invention is defined in the Claims, which follow the Detailed Description, and this section in no way alters or affects that scope.

The present invention improves upon the SPS circuit described in the '577 patent, mentioned above, allowing comparable performance with simpler circuitry and/or fewer connections between the SPS controllers. In accordance therewith, there is provided a multi-phase power system. A plurality of Pulse Width Modulation (PWM) controllers are included, including a first PWM controller and at least one second PWM controller. The first PWM controller is configured to generate at least one first output signal based on a first clock signal, and to insert at least one synchronizing pulse into the first clock signal, the synchronizing pulse having a predetermined characteristic differing from pulses of the first clock signal, and to provide the first clock signal including the synchronizing pulse to the second PWM controller. The second PWM controller is configured to generate at least one second output signal based on the first clock signal, and to synchronize the generation of the first and second output signals using the synchronizing pulse within the first clock signal, thereby maintaining a predetermined phase relationship between the first and second output signals. The synchronizing pulse may be, for example, a skinny pulse or a pulse having a magnitude larger than the pulses of the first clock signal.

These and other aspects and features of the invention will be apparent to those skilled in the art from the following detailed description of the invention, taken together with the accompanying drawings.

DETAILED DESCRIPTION OF THE PREFERRED EMBODIMENT

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

As mentioned above, a switching power supply ("SPS") that has a ramp generator and a pulse width modulation ("PWM") comparator can be synchronously paralleled and interleaved with other SPSs of the same construction. This may be done by communicating a common clock and time signature between them. According to a preferred embodiment of the present invention, one SPS is set to be the Master and to know the number of time slots in a PWM cycle. This Master SPS sends out the clock with a time signature that indicates a time reference for all paralleled SPSs. All other SPSs are the Slave SPSs, which are set to recognize the characteristics of the time signature and their own time slot. By assigning time slots, each SPS can synchronously generate PWM pulses that are interleaved or overlapped with each PS in the system.

Figure 1:
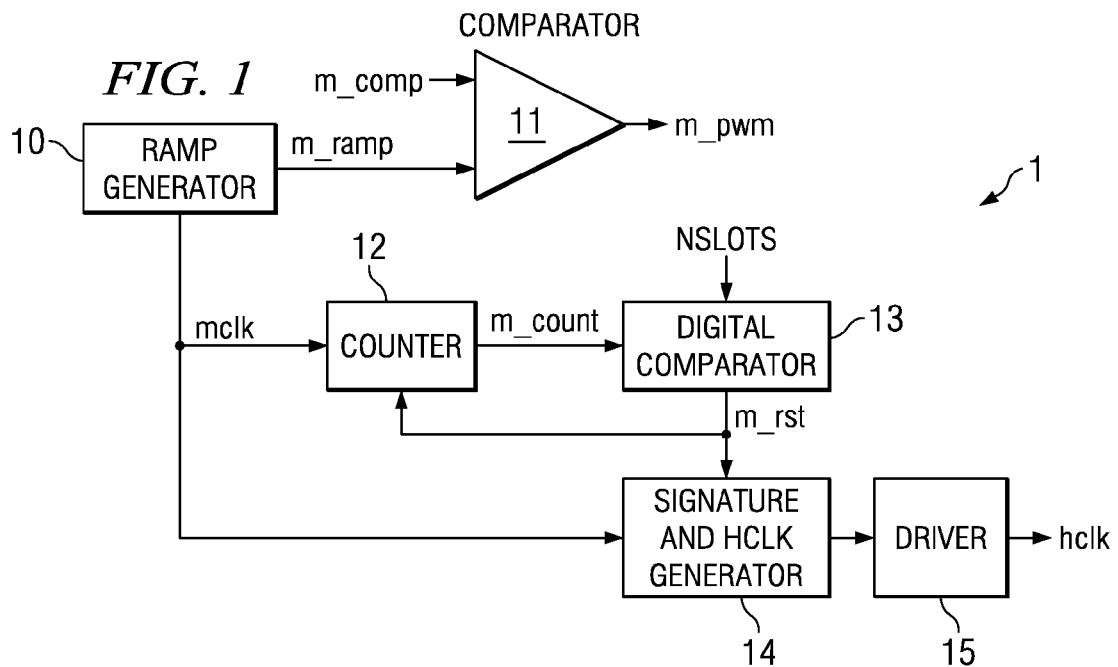
FIG. 1 is a diagram of a master SPS according to a preferred embodiment.

Referring now to FIG. 1, there is shown an SPS configured as a Master SPS 1. Included are a ramp generator 10, PWM comparator 11, counter 12, digital comparator 13, signature and hclk generator 14, and a driver 15, all connected as shown.

The Master PS 1 generates a PWM pulse, m_pwm, in conventional fashion, using the ramp generator 10, the PWM comparator 11, and an error signal, m_comp. The ramp generator 10 generates a triangular, or, sawtooth, signal, m_ramp, that is provided to one input of the PWM comparator 11. The error signal m_comp is a signal generated by other circuitry, and sets the "cut-off" threshold for the PWM comparator 11, by which the width of m_pwm is determined.

The ramp generator 10 also produces a synchronized clock, mclk, which has a frequency greater than the number of time slots, nslots, times the PWM frequency. The signal mclk is provided to the count input of the counter 12, which may be of conventional construction, and to one input of the signature and hclk generator 14. The counter 12 receives mclk and provides a count, m_count, of the mclk clock cycles to the digital comparator 13, which compares m_count to nslots. When m_count reaches nslots, then the digital comparator 13 sends a reset signal, m_rst, to the counter 12 to restart the counting, and to the other input of the signature and hclk generator 14. The signature and hclk generator 14 combines m_rst and mclk to create a clocking signal with a time signature, which is then put through a driver to create hclk. Different ways of introducing the time signature are discussed below. The driver functions as a conventional buffer to provide a "good" signal on the shared hclk line, i.e., having specified electrical characteristics required by the driven circuitry (not shown).

Figure 2:
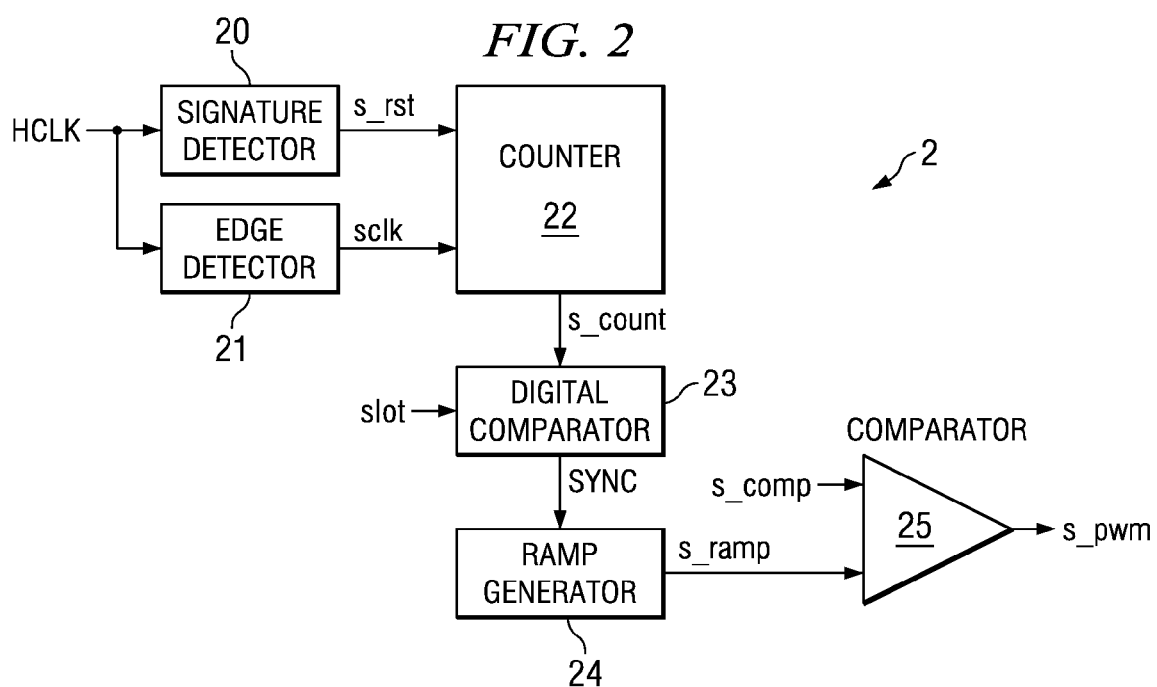
FIG. 2 is a diagram of a slave SPS according to a preferred embodiment.

Referring now to FIG. 2, there is shown an SPS configured as a Slave SPS 2. Included are a signature detector 20, edge detector 21, counter 22, digital comparator 23, ramp generator 24 and PWM comparator 25, all connected as shown.

The common clock, hclk, is received from the Master SPS 1 by the Slave SPS 2 and provided to the input of the signature detector 20 and the input of the edge detector 21. The edge detector 21 creates a clocking signal, sclk, which is internal to the Slave SPS 2. When a time signature is recognized by the signature detector 20, it indicates this by asserting the s_rst signal. The s_rst signal resets the counter 22, whereupon it immediately restarts counting. The counter 22 receives the sclk signal and provides a count, s_count, of the sclk clock cycles to one input of the digital comparator 23. The other input of the digital comparator 23 receives a digital value, slot, which represents the relative phase of operation for that Slave SPS 2. The digital comparator 23 compares s_count with slot, and when s_count matches slot, the digital comparator 23 changes the digital state of a sync signal, which it provides as an output signal. The sync signal is then utilized by the ramp generator 24 to create s_ramp, which is, in turn, used by the pwm comparator 25 to compare with an error signal, s_comp, and to create the Slave SPS's PWM pulse, s_pwm. The Slave's s_pwm signal is therefore synchronized with the Master's m_pwm signal and all other Slave s_pwm signals.

Generating a clean, easily recognizable time signature is very important in order to avoid missing or extra PWM pulses in a PWM cycle.

Figure 3:
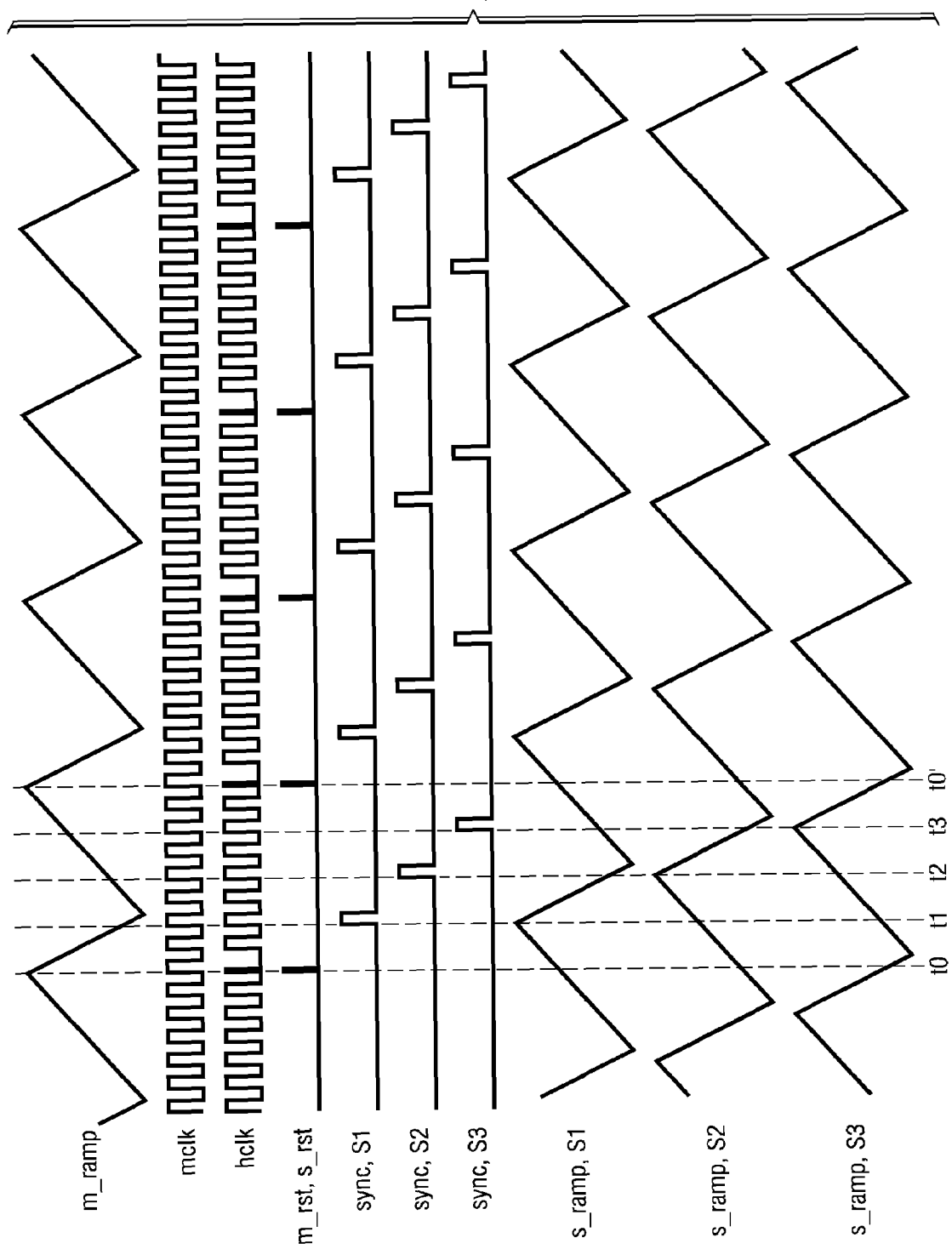
FIG. 3 shows a group of graphs of voltage versus time, showing several signals in a system including a master SPS and three slave SPS as in FIGS. 1 and 2, vertically aligned to show relative timing.

Referring now to FIG. 3, this figure shows a group of graphs of voltage versus time, showing several signals in a system including a Master SPS 1 and three Slave SPS 2 as in FIGS. 1 and 2, vertically aligned to show relative timing. The signals shown are m_ramp, mclk, hclk, m_rst (which is substantially the same as s_rst), synch, S1 (the synch signal in the first Slave SPS 2), synch, S2 (the synch signal in the second Slave SPS 2), synch, S3 (the synch signal in the third Slave SPS 2), s_ramp, S1 (the s_ramp signal in the first Slave SPS 2), s_ramp, S2 (the s_ramp signal in the second Slave SPS 2), and s_ramp, S3 (the s_ramp signal in the third Slave SPS 2).

According to the preferred embodiment depicted in FIG. 3, the time signature is a modified width pulse in the hclk waveform. This is shown in the graph for signal m_rst in FIG. 3 with a "skinny" pulse, i.e., one that is relatively narrow compared to a clock pulse. In FIG. 3, the m_ramp signal is an oscillating triangular waveform with eight mclk cycles per period (nslots=7 in the Master SPS 1). The Master SPS 1 generates hclk with one skinny pulse at time t0, which coincides with the m_ramp change in direction, for every eight clock pulses. The Master SPS 1 and each Slave SPS 2 have a reset signal (m_rst and s_rst, respectively) that coincides with the skinny pulse event.

The counters start with a count of 0, establishing slot 0, and count up to 7, upon which the counters reset to 0, and the process repeats. Each count represents a slot that is assigned the number of the count. The skinny pulse is placed in slot 0, i.e., at time t0 in the first exemplary period shown in the figure. The first, second and third Slave SPSs have been assigned slot 2, 4, and 6, respectively, to create a synchronized, interleaved 4-phase system. Thus, it can be seen that the first Slave SPS generates its sync pulse at time t1, which coincides with slot 2, the second Slave SPS generates its sync pulse at time t2, and the third Slave SPS generates its sync pulse at time t3. Time t0' is slot 0 for the next period. Using these three sync pulses, the three Slave SPSs generate their respective s_ramp signals, with their change in direction coinciding with their respective sync pulses, as shown.

Figure 4:
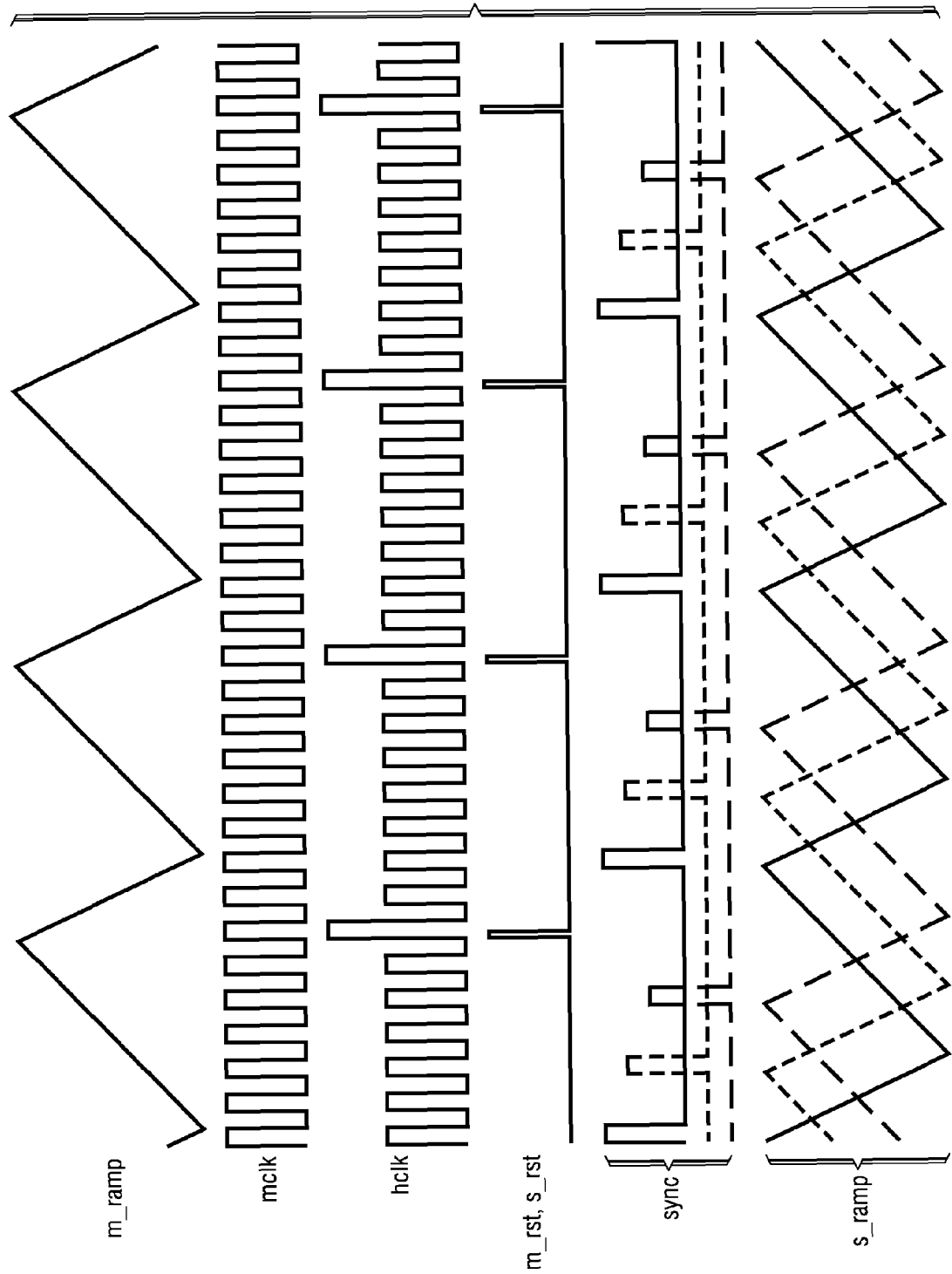
FIG. 4 is a group of graphs similar to that of FIG. 3, but showing signals when a "tall" pulse time signature technique is used.

According to another preferred embodiment, the time signature is a modified height pulse, e.g. a tall pulse, i.e., one having a magnitude, such as voltage, greater than the clock pulses of the hclk signal. This is shown in FIG. 4., in which the signals correspond to signals having the same name in FIG. 3. In FIG. 4, however, the sync signals and the s_ramp signals are shown overlapping to aid in seeing their relative timing. All signals act as in FIG. 4, except the hclk signal which has a time signature of one pulse which is larger in amplitude, rather than being a skinny pulse, at the coincident change in m_ramp slope.

Figure 5:
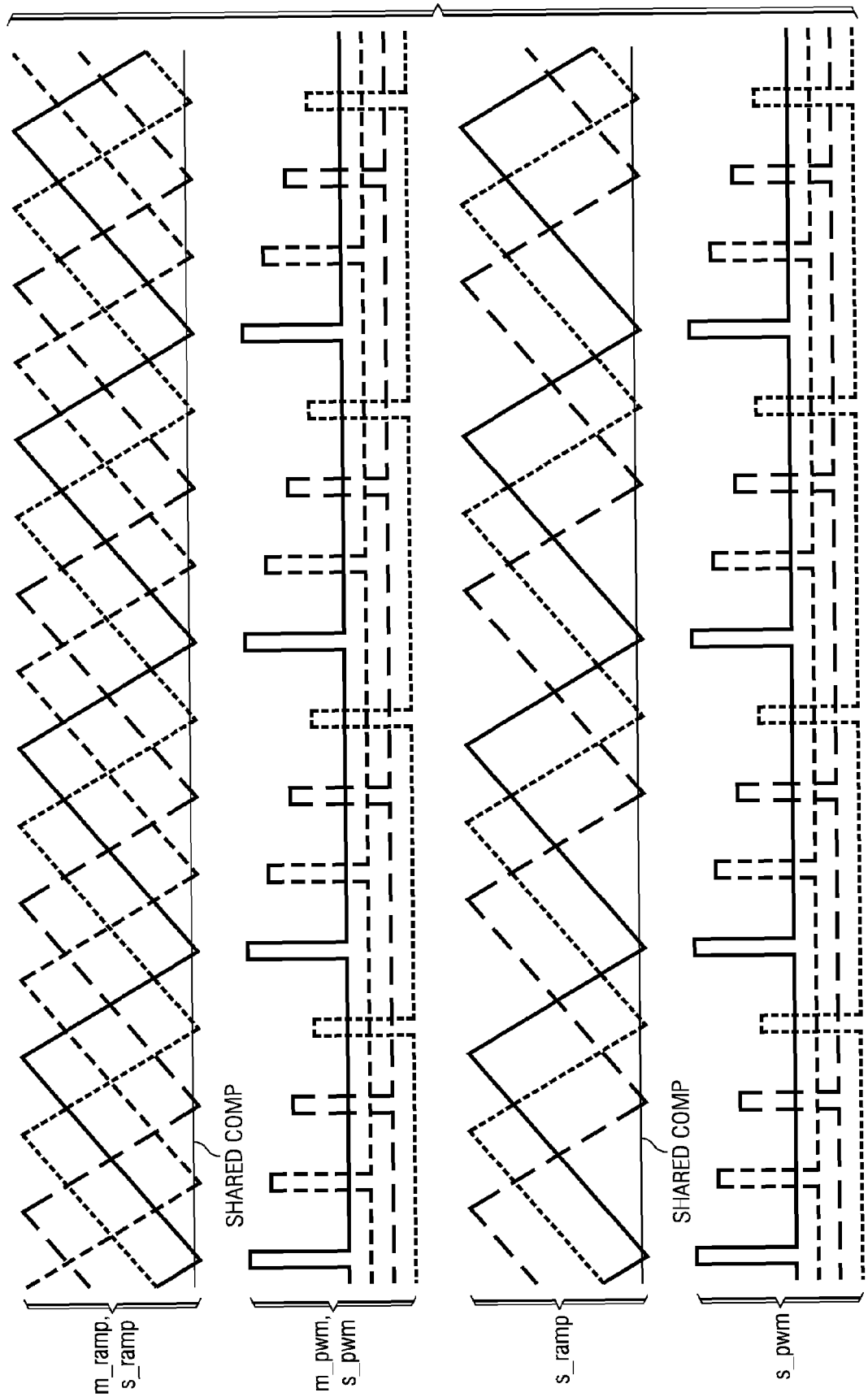
FIG. 5 is a group of graphs similar to that of FIG. 3, but showing signals for an eight phase system with one group of slave SPSs generating a PWM pulse at the same time slot as another group of SPSs, including the master SPS.

According to a still further preferred embodiment, FIG. 5 is a diagram similar to that of FIG. 4, but which shows an 8-Phase system with one group of Slave SPSs generating a PWM pulse at the same time slot as another group of SPSs, including the Master SPS. This also shows how a shared comp signal can be used with all of the SPSs to generate PWM pulses.

One benefit of the present invention is simplicity and flexibility when paralleling separate SPSs. The Slave PSs do not need to know the number of time slots or the PWM frequency, so only a single wire (for signal hclk) is required between the SPSs. Any number of PSs can be paralleled in order to meet the power requirements for an application.

For example, by way of comparison, in the '577 patent mentioned above, a missing pulse indicated a reset to the counters. In such a system, complicated circuitry or extra connections between SPSs are required to generate a sync pulse in the Slave SPS that allows s_pwm to align with m_pwm. The present invention allows a simple solution to overlapping a Slave SPS's PWM pulse (s_pwm) within the same time slot as a Master SPS's PWM pulse (m_pwm). The invention also allows a wider range of frequencies for hclk, which is important when the SPSs must support a wide range of PWM frequencies and a large number of time slots.

The two exemplary time signatures discussed above each have benefits of their own as well. The modified width pulse scheme is beneficial when only one voltage level is available for the high level. The modified height pulse scheme is beneficial when more than one voltage level is available for the high levels.

Although the present invention and its advantages have been described in detail, it should be understood that various changes, substitutions and alterations can be made herein without departing from the spirit and scope of the invention as defined by the appended claims. For example, other types of time signatures may be readily thought of and employed.

What is claimed is:

1. A multi-phase power system comprising:
a first Pulse Width Modulation (PWM) controller that is configured to generate a first output signal based on a first clock signal, to insert a synchronizing pulse into the first clock signal having a predetermined characteristic differing from pulses of the first clock signal, and to provide the first clock signal including the synchronizing pulse to the second PWM controller; and
a second PWM controller that is configured to generate a second output signal based on the first clock signal and to synchronize the generation of the first and second output signals using the synchronizing pulse within the first clock signal, thereby maintaining a predetermined phase relationship between the first and second output signals, wherein the predetermined characteristic of the synchronizing pulse is that the synchronizing pulse is substantially shorter in duration than the pulses of the first clock signal.

2. A multi-phase power system comprising:
a first PWM controller that is configured to generate a first output signal based on a first clock signal, to insert a synchronizing pulse into the first clock signal having a predetermined characteristic differing from pulses of the first clock signal, and to provide the first clock signal including the synchronizing pulse to the second PWM controller; and
a second PWM controller that is configured to generate a second output signal based on the first clock signal and to synchronize the generation of the first and second output signals using the synchronizing pulse within the first clock signal, thereby maintaining a predetermined phase relationship between the first and second output signals, wherein the predetermined characteristic of the synchronizing pulse is that the synchronizing pulse is substantially greater in magnitude than the pulses of the first clock signal.

3. The multiphase power system of claim 1, wherein the first PWM further comprises:
reset circuitry that receives the first clock signal; and
a clock generator that is coupled to the reset circuit and to ramp generator, wherein the clock generator receives the first clock signal, and wherein the clock generator inserts the synchronization pulse into the first clock signal.

4. The multiphase power system of claim 3, wherein the reset circuitry further comprises:
a counter that receives the first clock signal and that outputs generates a count signal; and
a digital comparator that is coupled to the counter so as to receive the count signal, that compares the count signal to a slot signal, and that outputs a reset signal to the counter and the clock generator when the count signal is greater than the slot signal.

5. The multiphase power system of claim 2, wherein the first PWM further comprises:
reset circuitry that receives the first clock signal; and
a clock generator that is coupled to the reset circuit and to ramp generator, wherein the clock generator receives the first clock signal, and wherein the clock generator inserts the synchronization pulse into the first clock signal.

6. The multiphase power system of claim 5, wherein the reset circuitry further comprises:
a counter that receives the first clock signal and that outputs generates a count signal; and
a digital comparator that is coupled to the counter so as to receive the count signal, that compares the count signal to a slot signal, and that outputs a reset signal to the counter and the clock generator when the count signal is greater than the slot signal.

7. An apparatus comprising:
a first switching power supply including:
a ramp generator that provides a first clock signal and a ramp signal;
a PWM comparator that is coupled to the ramp generator so as to receive the ramp signal and that outputs a first PWM signal;
reset circuitry that is coupled to the ramp generator so as to receive the first clock signal; and
a clock generator that is coupled to the reset circuit and to ramp generator, wherein the clock generator receives the first clock signal, and wherein the clock generator inserts a synchronization pulse into the first clock signal to generate a second clock signal, and wherein the synchronization pulse has at least one of a shorter duration and greater magnitude that the pulses of first clock signal; and
a second switching power supply having a PWM generator, wherein the second switching power supply is coupled to the clock generator, and wherein the PWM generator outputs a second PWM signal.

8. The apparatus of claim 7, wherein the reset circuitry further comprises:
a counter that is coupled to the ramp generator so as to receive the first clock signal and that outputs generates a count signal; and
a digital comparator that is coupled to the counter so as to receive the count signal, that compares the count signal to a slot signal, and that outputs a reset signal to the counter and the clock generator when the count signal is greater than the slot signal.

9. The apparatus of claim 7, wherein the first switching power supply further comprises a driver that is coupled between the clock generator and the second switching power supply.

10. The apparatus of claim 7, wherein the second switching power supply further comprises:
a signature detector that is coupled to the clock generator so as to receive the second clock signal;
an edge detector that is coupled to the clock generator so as to receive the second clock signal;
a second counter that is coupled to the signature detector and edge detector;
a second digital comparator that is coupled to the second counter;
a second ramp generator that is coupled to the second digital comparator; and
a second PWM comparator that is coupled to the second ramp generator, wherein the second PWM outputs the second PWM signal.

11. A method comprising:
Generating, by a PWM comparator, a first PWM signal based at least in part on a ramp signal from a ramp generator;

counting cycles of a first clock signal output from the ramp generator;

generating a reset signal when the counted number of cycles of the first clock signal to a predetermined number of slots;

inserting a synchronization pulse into the first clock signal to generate a second clock signal, wherein the synchronization pulse has at least one of a shorter duration and greater magnitude that the pulses of first clock signal; and generating a second PWM signal based at least in part on the second clock signal, wherein the second PWM signal is output from a PWM generator.

12. The method of claim 11, wherein the step of generating the second PWM signal further comprises the steps of:

counting cycles of the second clock signal by a counter;

generating a reset signal for the counter when the synchronization pulse is detected;

generating a synchronization signal when the cycles counted by the counter are greater than a second predetermined number of slots;

generating a second ramp signal base at least in part on the synchronization signal; and generating the second PWM signal base at least in part on the synchronization signal.

* * * * *